United States Patent
Nguyen et al.

(10) Patent No.: US 8,885,997 B2
(45) Date of Patent: Nov. 11, 2014

(54) NED POLARIZATION SYSTEM FOR WAVELENGTH PASS-THROUGH

(75) Inventors: Ian A. Nguyen, Bellevue, WA (US); Tapani Levola, Tampere, FL (US); David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 29 days.

(21) Appl. No.: 13/601,727

(22) Filed: Aug. 31, 2012

(65) Prior Publication Data

US 2014/0064655 A1    Mar. 6, 2014

(51) Int. Cl.
*G02B 6/34* (2006.01)
*G02B 5/18* (2006.01)
*G02B 27/00* (2006.01)

(52) U.S. Cl.
CPC .......... *G02B 5/1814* (2013.01); *G02B 27/0081* (2013.01)
USPC ........................................................ 385/37

(58) Field of Classification Search
CPC ............. G02B 5/1814; G02B 27/0081; G02B 27/0172; G02B 27/4272; G02B 27/44; G02B 2027/0125
USPC ................ 385/31, 37; 345/87, 105, 106, 108; 359/13, 14, 15, 558, 566, 56, 572, 618, 359/629, 630, 633, 636, 639
See application file for complete search history.

(56) References Cited

U.S. PATENT DOCUMENTS

| | | | |
|---|---|---|---|
| 6,522,794 B1 | 2/2003 | Bischel et al. | |
| 7,027,671 B2 | 4/2006 | Huck et al. | |
| 7,272,275 B2 | 9/2007 | Spoonhower et al. | |
| 7,573,640 B2 * | 8/2009 | Nivon et al. | 359/630 |
| 7,773,849 B2 | 8/2010 | Shani | |
| 8,113,692 B2 | 2/2012 | Chou et al. | |
| 8,320,032 B2 * | 11/2012 | Levola | 359/34 |
| 8,376,548 B2 * | 2/2013 | Schultz | 353/10 |
| 8,548,290 B2 * | 10/2013 | Travers et al. | 385/37 |
| 2005/0002611 A1 | 1/2005 | Levola | |
| 2005/0180687 A1 | 8/2005 | Amitai | |

(Continued)

FOREIGN PATENT DOCUMENTS

| | | |
|---|---|---|
| EP | 2196729 A1 | 6/2010 |
| EP | 2381290 A1 | 10/2011 |
| WO | 2007141587 A1 | 12/2007 |

OTHER PUBLICATIONS

Deng, et al., "Design Procedures for Slanted-Angle SOI Polarization Rotators", In Conference of Optical Fiber Communication, vol. 1, Feb. 22, 2004, 3 pages.

(Continued)

*Primary Examiner* — Charlie Peng
(74) *Attorney, Agent, or Firm* — Micah Goldsmith; Judy Yee; Micky Minhas

(57) ABSTRACT

A system and method are disclosed for providing uniform color distribution of light emitted from a light source to an eye box in a near eye display (NED). An example of the system and method uses an optical element including two or more waveguides optimized to different colors of the visible light spectrum. The optical element further includes one or more polarization state generators for controlling the polarization of light incident on the waveguides to facilitate coupling of light into a matched waveguide, and to impede coupling of light into unmatched waveguides.

8 Claims, 11 Drawing Sheets

(56) References Cited

U.S. PATENT DOCUMENTS

| | | |
|---|---|---|
| 2006/0203339 A1* | 9/2006 | Kleinberger et al. ......... 359/465 |
| 2006/0221448 A1 | 10/2006 | Nivon et al. |
| 2006/0228073 A1* | 10/2006 | Mukawa et al. ................ 385/31 |
| 2006/0291769 A1 | 12/2006 | Spoonhower et al. |
| 2007/0171328 A1* | 7/2007 | Freeman et al. ................ 349/65 |
| 2009/0141324 A1* | 6/2009 | Mukawa ......................... 359/13 |
| 2010/0079865 A1* | 4/2010 | Saarikko et al. .............. 359/566 |
| 2010/0134534 A1 | 6/2010 | Seesselberg et al. |
| 2011/0109528 A1* | 5/2011 | Mun et al. ......................... 345/8 |
| 2011/0221659 A1 | 9/2011 | King, III et al. |

OTHER PUBLICATIONS

International Search Report and Written Opinion dated Nov. 18, 2013 in International Patent Application No. PCT/US2013/057747.

* cited by examiner

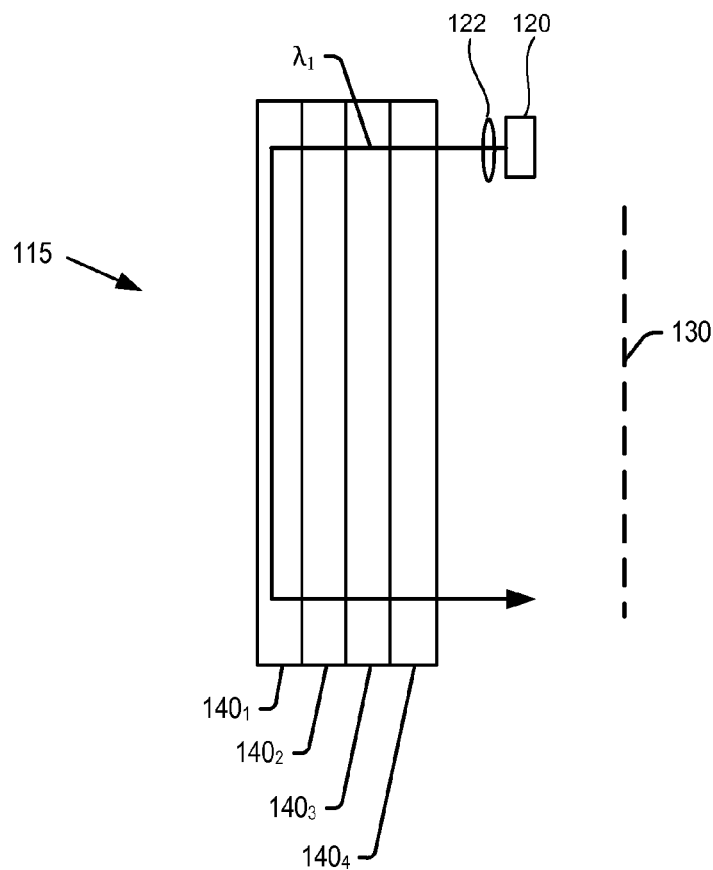
*Fig. 6*
*Fig. 7*
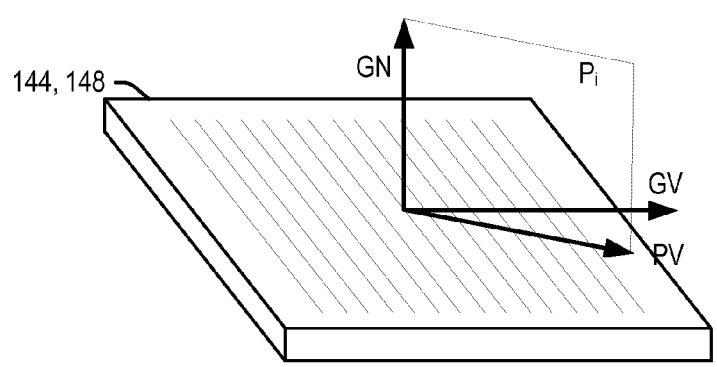

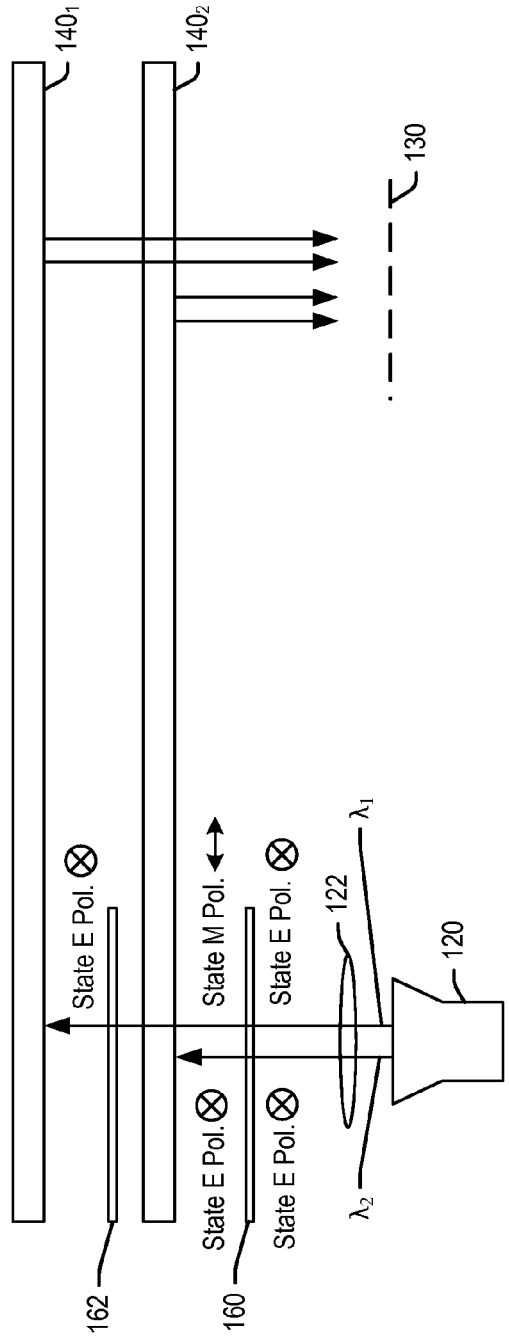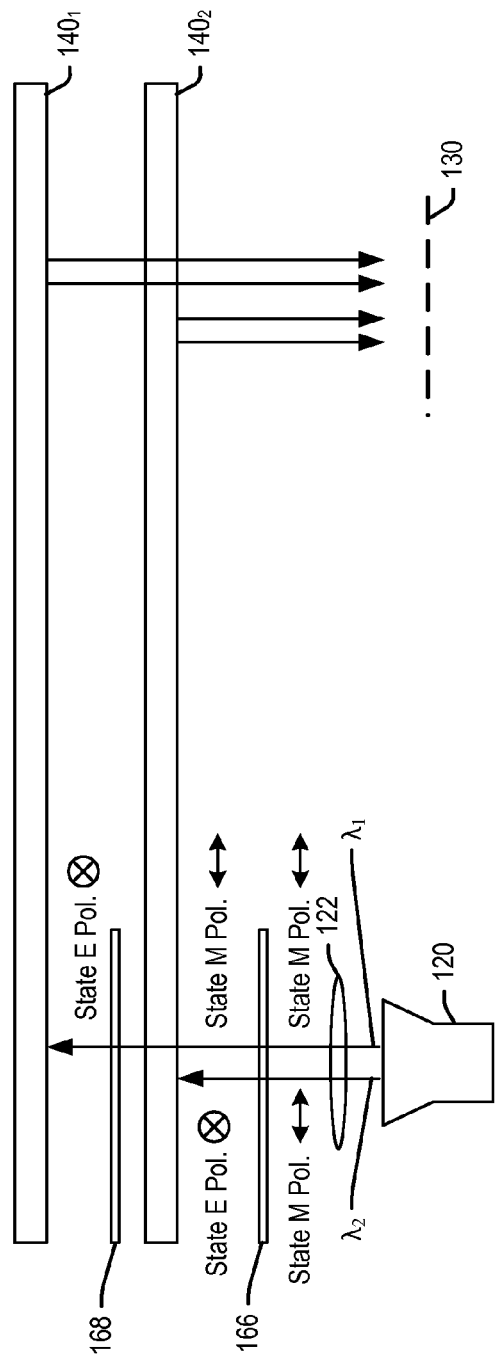

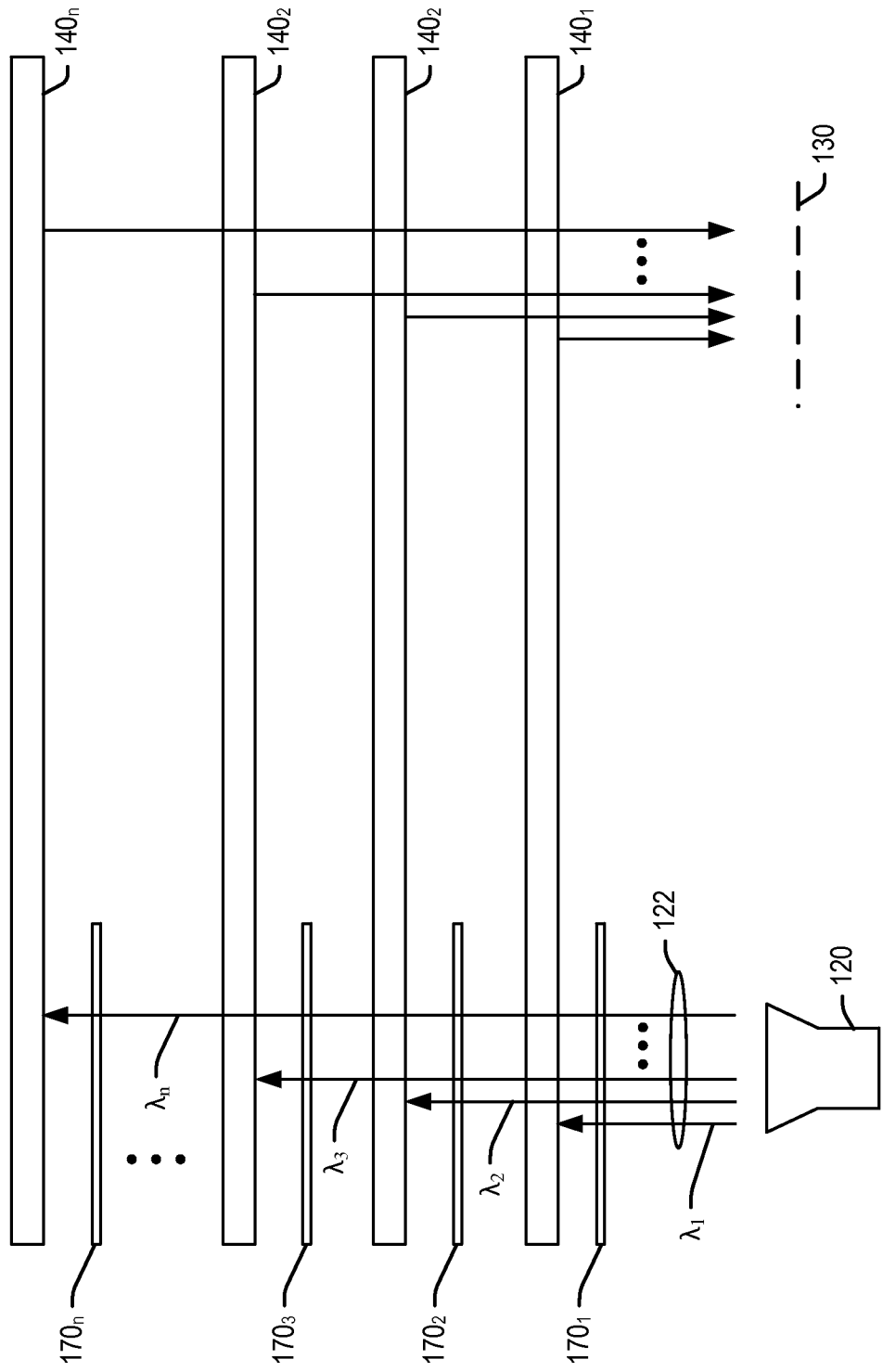

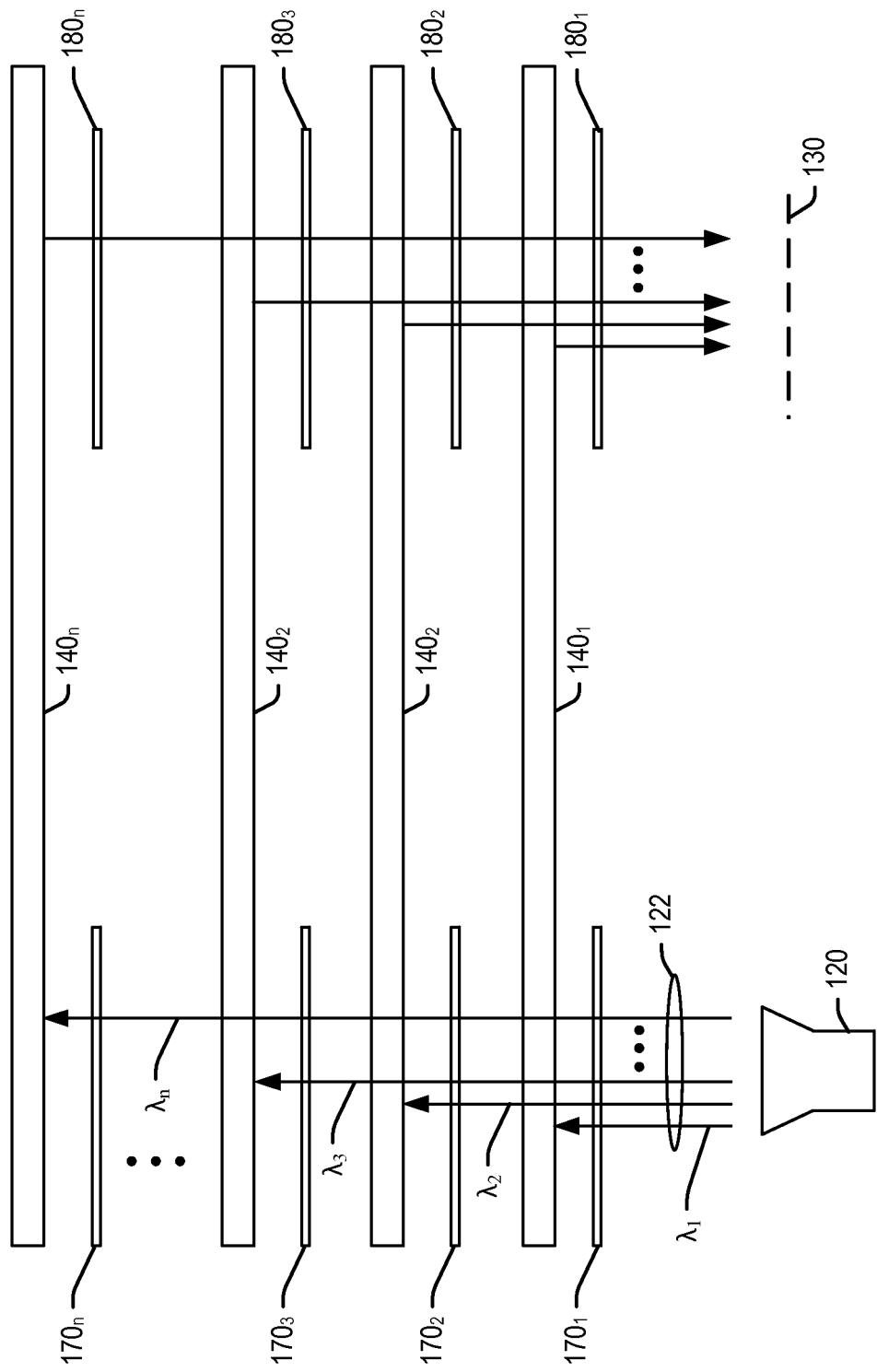

NED POLARIZATION SYSTEM FOR WAVELENGTH PASS-THROUGH

BACKGROUND

A see-through, near-to-eye display (NED) unit may be used to display virtual imagery mixed with real-world objects in a physical environment. Such NED units include a light engine for generating an image, and an optical element which is partly transmissive and partly reflective. The optical element is transmissive to allow light from the outside world to reach the eye of an observer, and partly reflective to allow light from the light engine to reach the eye of the observer. The optical element may include diffractive optical elements (DOEs) or holograms within a planar waveguide to diffract the imagery from the microdisplay to the eye of the user.

In practice, NED units may include a stack of multiple waveguides, with each waveguide assigned to a wavelength component. In particular, by controlling aspects of the DOE within a waveguide, the waveguide may be matched, or optimized, to couple with the highest efficiency with a specific wavelength component. Optimizing the different DOEs to different colors of the visible light spectrum allows an NED unit to provide a full color experience.

In a stack of multiple waveguides, wavelength components matched distal waveguides in the stack (i.e., those furthest from the light engine) pass through the more proximal waveguides in the stack. Often the wavelength components intended for the distal waveguides couple into the more proximal waveguides instead of passing straight through. This results in loss of brightness, in non-uniformity of the colors reaching the observer from the NED unit and degradation of the quality of the reproduced virtual image.

SUMMARY

Embodiments of the present technology relate to a system and method for selectively altering the polarization state of different wavelength bands as they pass through waveguides in an NED unit. DOEs on or within waveguides are polarization-sensitive. By altering the polarization of a wavelength band to a state to which a DOE on a waveguide is less sensitive, the wavelength band may pass through that DOE largely or entirely unabated. The polarization of the wavelength band is controlled to be in a state that couples the light to its intended waveguide through the DOE prior to entering the waveguide.

In an example, the present technology relates to a method for presenting an image, comprising: (a) projecting light from a light source into an optical element, the light including at least first and second wavelength bands, and the optical element including at least first and second waveguides, the first and second waveguides each having at least one optical grating; (b) controlling the polarization of the first wavelength band incident on the first waveguide to be different than the polarization of the other than first wavelength bands incident on the first waveguide so that the first wavelength band couples within the first waveguide to a greater extent than the other than first wavelength bands; and (c) controlling the polarization of the second wavelength band incident on the second waveguide to be different than the polarization of the other than second wavelength bands incident on the second waveguide so that the second wavelength band couples within the second waveguide to a greater extent than other than second wavelength bands.

In another example, the present technology relates to a method for presenting an image, comprising (a) projecting light from a light source into an optical element, the light including between 2 and n wavelength bands, and the optical element including between 2 and m waveguides, the $i^{th}$ wavelength band being matched to the $j^{th}$ waveguide, where i=1 to n and j=1 to m; and (b) passing one or more wavelength bands of the 2 to n wavelength bands through a plurality of polarization state generators, each polarization state generator associated with a waveguide of the 2 to m waveguides, the plurality of polarization state generators controlling the polarization of the one or more wavelength bands passing therethrough to a state facilitating coupling of the $i^{th}$ wavelength band within the $j^{th}$ waveguide, while impeding coupling of remaining wavelength bands passing through the $j^{th}$ waveguide.

In a further example, the present technology relates to an optical element for transmitting light from a light source to an eye box, comprising: a first waveguide, the first waveguide including at least a first optical grating for receiving light from the light source and coupling a first portion of the light into the first waveguide; a second waveguide, the second waveguide including at least a second optical grating for receiving light from the light source and coupling a second portion of the light into the second waveguide; a first polarization state generator between the light source and first waveguide, the first polarization state generator modifying a polarization of the first portion of light to couple into the first waveguide; and a second polarization state generator between the first diffraction grating and the second diffraction grating, the second polarization state generator modifying a polarization of the second portion of light to couple into the second waveguide.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a side view of a portion of one embodiment of a head-worn NED unit including an optical element having a plurality of waveguides.

FIG. 7 illustrates a plane of incidence of light incident on a diffraction grating.

FIG. 8 is an end view of a first embodiment of imaging optics from an NED unit including multiple waveguides and polarization state generators for altering the polarization of wavelength bands as they enter the waveguides.

FIG. 9 is an end view of a second embodiment of imaging optics from an NED unit including multiple waveguides and polarization state generators for altering the polarization of wavelength bands as they enter the waveguides.

FIG. 12 is an end view of a third embodiment of imaging optics from an NED unit including multiple waveguides and polarization state generators for altering the polarization of wavelength bands as they enter the waveguides.

FIG. 13 is an end view of a fourth embodiment of imaging optics from an NED unit including multiple waveguides and polarization state generators for altering the polarization of wavelength bands as they enter and leave the waveguides.

DETAILED DESCRIPTION

Embodiments of the present technology will now be described with reference to FIGS. 1-16, which in general relate to imaging optics for selectively altering the polarization state of different wavelength bands as they pass through waveguides in an NED unit. DOEs on waveguides are sensitive to light polarization. Thus, by selectively controlling the polarization of wavelength bands entering a DOE on a waveguide, a wavelength band matched to that waveguide may couple through that DOE with high efficiency, while unmatched wavelength bands may pass through the DOE and the waveguide largely or entirely unaffected. While an example using DOEs is described herein, it is understood that a waveguide may include DOEs, holograms, surface relief gratings or other type of periodic structures in the optical elements. These structures may be referred to herein as "optical gratings."

In embodiments explained below, the NED unit may be a head-worn display unit used in a mixed reality system. However, it is understood that embodiments of the NED unit and imaging optics contained therein may be used in a variety of other optical applications, for example in optical couplers and other light modulator devices. The figures are provided for an understanding of the present technology, and may not be drawn to scale.

Figure 1:
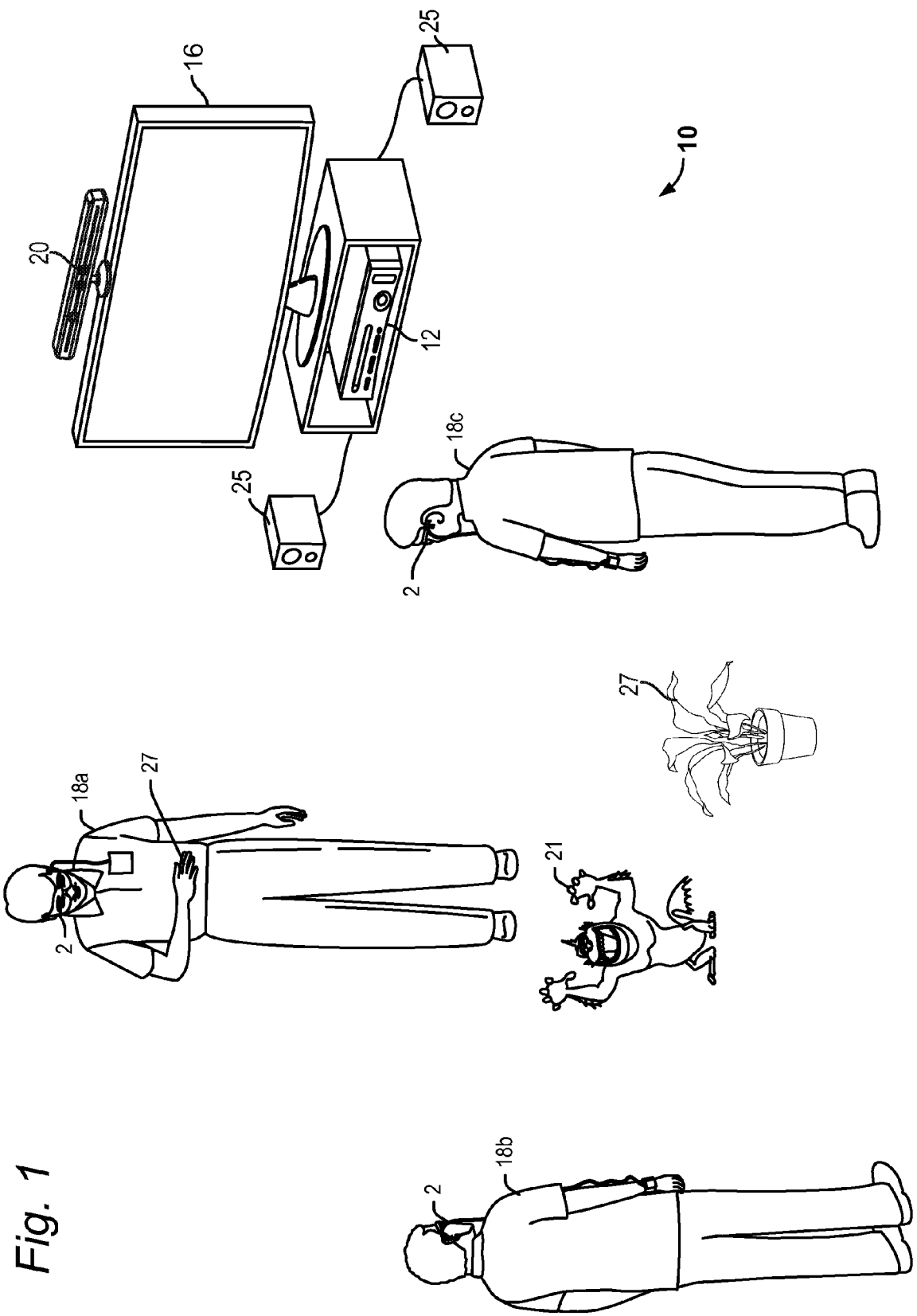
FIG. 1 is an illustration of example components of one embodiment of a system for presenting a virtual environment to one or more users.

FIG. 1 illustrates an example of NED units 2 as head-worn displays used in a mixed reality system 10. The NED units may be worn as glasses including lenses which are to a degree transparent so that a user can look through the display element at real-world objects 27 within the user's field of view (FOV). The NED unit 2 also provides the ability to project virtual images 21 into the FOV of the user such that the virtual images may also appear alongside the real-world objects. Although not critical to the present technology, the mixed reality system may automatically track where the user is looking so that the system can determine where to insert the virtual image in the FOV of the user. Once the system knows where to project the virtual image, the image is projected using the display element.

FIG. 1 shows a number of users 18a, 18b and 18c each wearing a head-worn NED unit 2. Head-worn NED unit 2, which in one embodiment is in the shape of glasses, is worn on the head of a user so that the user can see through a display and thereby have an actual direct view of the space in front of the user. More details of the head-worn NED unit 2 are provided below.

The NED unit 2 may provide signals to and receive signals from a processing unit 4 and a hub computing device 12. The NED unit 2, processing unit 4 and hub computing device 12 may cooperate to determine the FOV of each user 18, what virtual imagery should be provided within that FOV and how it should be presented. Hub computing device 12 further includes a capture device 20 for capturing image data from portions of a scene within its FOV. Hub computing device 12 may further be connected to an audiovisual device 16 and speakers 25 that may provide game or application visuals and sound. Details relating to the processing unit 4, hub computing device 12, capture device 20, audiovisual device 16 and speakers 25 are provided for example in United States Patent Publication No. 2012/0105473, entitled, "Low-Latency Fusing of Virtual and Real Content," published May 3, 2012, which application is hereby incorporated by reference herein in its entirety.

Figure 2:
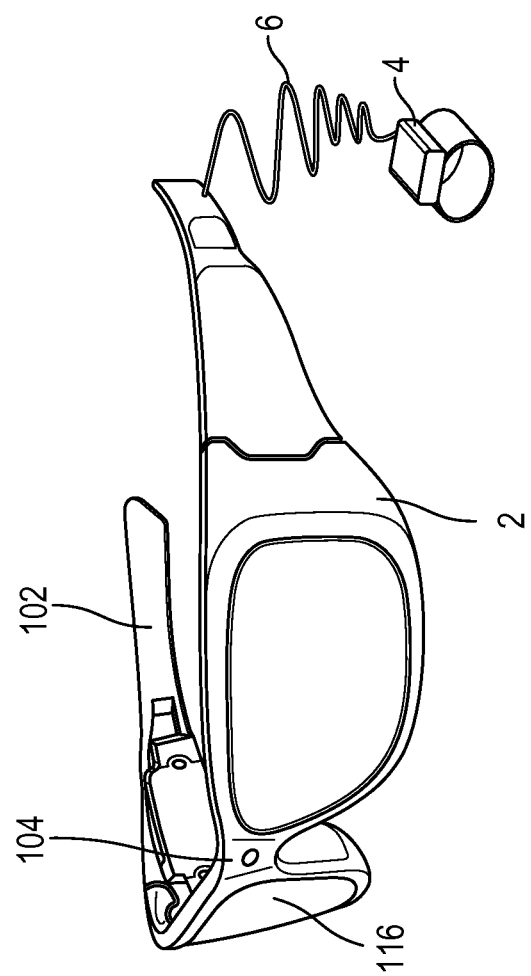
FIG. 2 is a perspective view of one embodiment of a head-worn NED unit.
Figure 3:
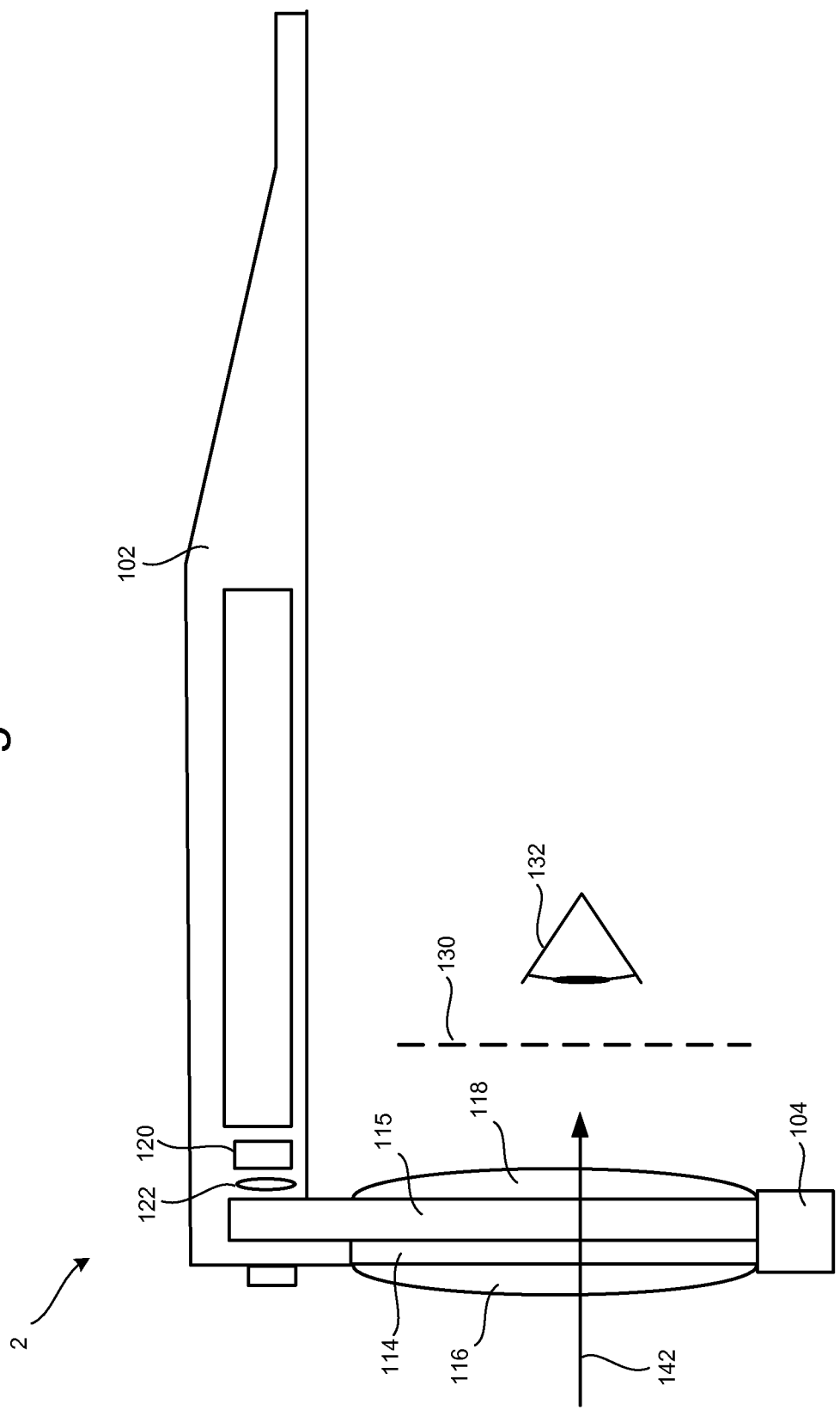
FIG. 3 is a side view of a portion of one embodiment of a head-worn NED unit.

FIGS. 2 and 3 show perspective and side views of the head-worn NED unit 2. FIG. 3 shows the right side of head-worn NED unit 2, including a portion of the device having temple 102 and nose bridge 104. A portion of the frame of head-worn NED unit 2 will surround a display (that includes one or more lenses). The display includes light-guide optical element 115, see-through lens 116 and see-through lens 118. In one embodiment, light-guide optical element 115 is behind and aligned with see-through lens 116, and see-through lens 118 is behind and aligned with light-guide optical element 115. See-through lenses 116 and 118 are standard lenses used in eye glasses and can be made to any prescription (including no prescription). Light-guide optical element 115 channels artificial light to the eye. More details of light-guide optical element 115 are provided below.

Mounted to or inside temple 102 is an image source, which (in embodiments) includes a light engine such as a microdisplay 120 for projecting a virtual image and lens 122 for directing images from microdisplay 120 into light-guide optical element 115. In one embodiment, lens 122 is a collimating lens. Microdisplay 120 projects an image through lens 122.

There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element (also called just optical element) 115 may transmit light from microdisplay 120 to an eye box 130. The eye box 130 is a two-dimensional area, positioned in front of an eye 132 of a user wearing head-worn NED unit 2, through which light passes upon leaving the optical element 115. Optical element 115 also allows light from in front of the head-worn NED unit 2 to be transmitted through light-guide optical element 115 to eye box 130, as depicted by arrow 142. This allows the user to have an actual direct view of the space in front of head-worn NED unit 2 in addition to receiving a virtual image from microdisplay 120.

FIG. 3 shows half of the head-worn NED unit 2. A full head-worn display device may include another optical element 115, another microdisplay 120 and another lens 122. Where the head-worn NED unit 2 has two optical elements 115, each eye can have its own microdisplay 120 that can display the same image in both eyes or different images in the two eyes. In another embodiment, there can be one optical element 115 which reflects light into both eyes from a single microdisplay 120.

Figure 4:
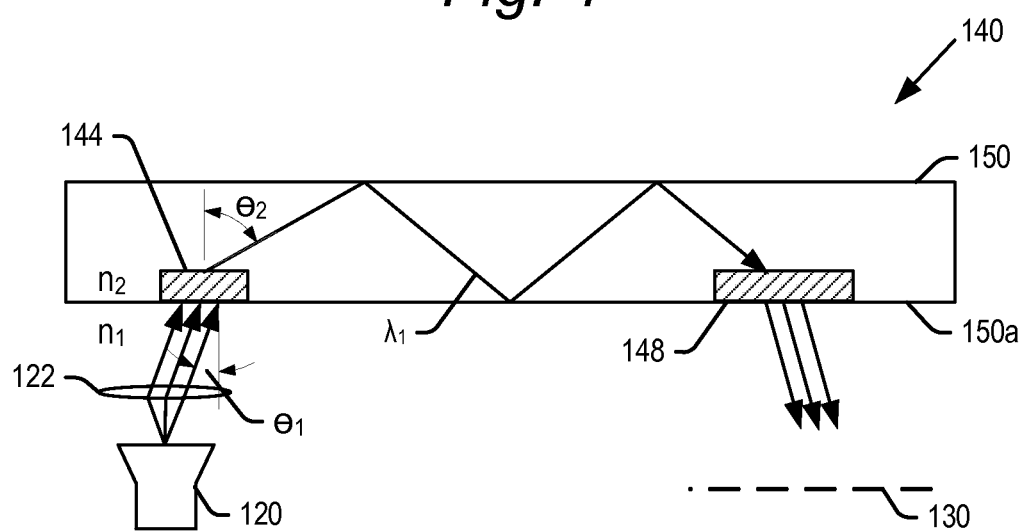
FIG. 4 is an edge view of an optical element from an NED unit including a waveguide having diffraction gratings.

Further details of light-guide optical element 115 will now be explained with reference to FIGS. 4-13. In general, optical element 115 includes two or more waveguides layered one on top of another to form an optical train. One such waveguide 140 is shown in FIG. 4. A waveguide 140 may be formed of a thin planar sheet of glass, though it may be formed of plastic or other materials in further embodiments. Waveguide 140 may include two or more diffraction gratings, including an input diffraction grating 144 which couples light rays into the waveguide 140, and an exit diffraction grating 148 which diffracts light rays out of the waveguide 140. The gratings 144, 148 are shown as transmissive gratings affixed to, or within, a lower surface 150a of substrate 150. Reflective gratings affixed to the opposite surface of substrate 150 may be used in further embodiments.

FIG. 4 shows the total internal reflection of a wavelength band, $\lambda_1$ coupled into and out of waveguide 140. As used herein, a wavelength band may be comprised of one or more wavelengths, for example from the visible light spectrum. The illustration of FIG. 4 is a simplified view of a single wavelength band in a system where the second and higher diffraction orders are not present. Although not shown in FIG. 4, optical element 115 may further include polarization state generators in front of and sandwiched in between the waveguides as explained below.

Wavelength band $\lambda_1$ from microdisplay 120 is collimated through the lens 122 and is coupled into the substrate 150 by input diffraction grating 144 at an incident angle $\theta_1$. The input diffraction grating 144 redirects the wavelength band through an angle of diffraction $\theta_2$. The refractive index n2, angle of incidence $\theta_1$, and angle of diffraction $\theta_2$ are provided so that the wavelength band $\lambda_1$ undergoes total internal reflection within the substrate 150. The wavelength band $\lambda_1$ reflects off the surfaces of substrate 150 until it strikes exit diffraction grating 148, whereupon the wavelength band $\lambda_1$ is diffracted out of the substrate 150 toward eye box 130. Additional details of a waveguide such as waveguide 140 are disclosed for example in U.S. Pat. No. 4,711,512, entitled "Compact Head-Up Display," issued Dec. 8, 1987, which patent is incorporated by reference herein in its entirety.

Figure 5:
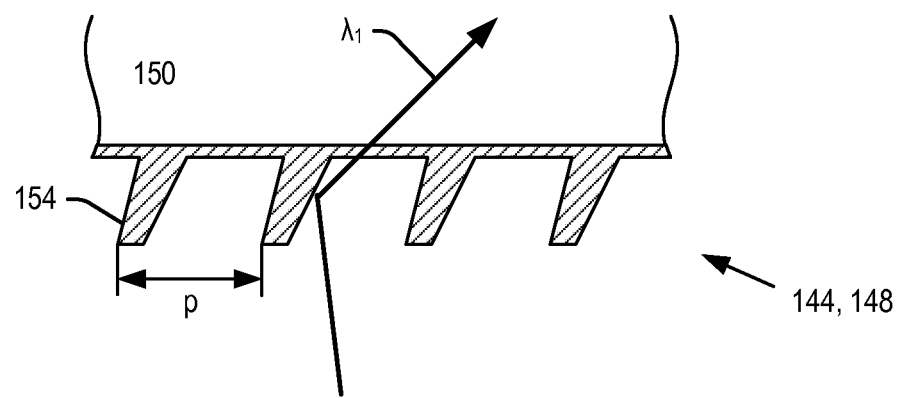
FIG. 5 is an enlarged partial view of a structure of a surface relief diffraction grating.
Figure 10:
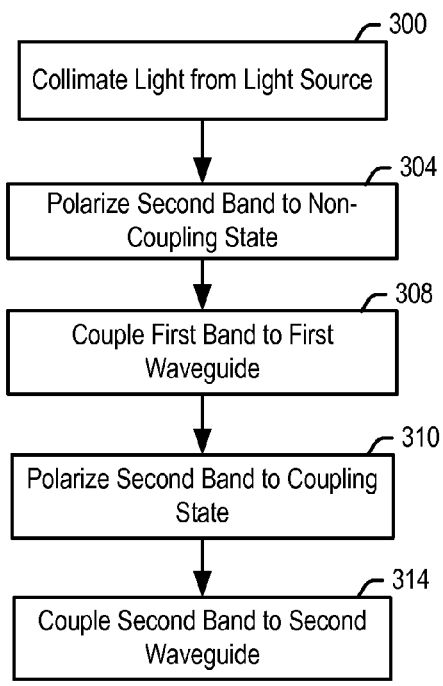
FIG. 10 is a flowchart of the operation of the imaging optics of the first embodiment shown in FIG. 8.

FIG. 5 is an enlarged partial view showing an example of a surface relief grating 154 forming part of a transmissive diffraction grating such as diffraction gratings 144 and/or 148 (FIG. 5 shows diffraction grating 144 diffracting light into substrate 150). The gratings 154 may have a slanted profile, with a period, p, but the gratings may have other profiles such as square and saw-tooth in further embodiments. As noted, the gratings 144, 148 may be reflective in further embodiments.

Waveguides may be optimized, or matched, to a particular wavelength band. This relationship may be determined according to the grating equation:

$$m\lambda = p(n_1 \sin\theta_1 + n_2 \sin\theta_2), \tag{1}$$

where:
m=diffraction order;
$\lambda$=the wavelength band matched to the waveguide/diffraction gratings;
p=grating period;
$n_1$=refractive index of incident medium;
$n_2$=refractive index of waveguide 140;
$\theta_1$=incident angle;
$\theta_2$=diffraction angle.

By varying parameters such as the grating period p and the refractive index $n_2$ of substrate 150, a particular waveguide 140 including diffraction gratings 144, 148 may be matched to a particular wavelength band. That is, a particular wavelength band may couple into a matched waveguide 140 with a higher coupling efficiency than other wavelength bands. Moreover, rigorous coupled wave theory (RCWT) can be used to optimize the profile parameters of gratings 154 (FIG. 5) to improve waveguide performance such as angular bandwidth, diffraction efficiency and polarization (explained below).

FIG. 4 illustrates a single waveguide 140 for a particular wavelength band via diffraction gratings 144, 148. In embodiments of the present technology, an optical element 115 may include two or more of the waveguides 140 described with respect to FIG. 4 layered together in an optical train. Each such waveguide 140 in optical element 115 may be matched to a different wavelength band. In one example shown in FIG. 6, there may be four such waveguides $140_1$-$140_4$ layered on top of each other. While it may be impractical to provide greater than four layers, it is conceivable that optical element may include more than four layers. Each may be optimized for different wavelength(s) of light, including for example violet light at a wavelength of about 400 nm., indigo light at about 445 nm., blue light at about 475 nm., green light at about 510 nm., yellow light at about 570 nm., orange light at about 590 nm., and/or red light at about 650 nm.

The waveguides $140_1$-$140_4$ may be provided in any order, and one or more of the waveguides $140_1$-$140_4$ may be matched to wavelengths other than those set forth above. In examples, a single waveguide 140 may be matched to a wavelength band covering different color wavelengths of the visible light spectrum.

In a stack of layered waveguides, an emitted wavelength band matched to a distal waveguide in the stack passes through all of the more proximal waveguides in the stack. For example, in the embodiment of FIG. 6, a wavelength band $\lambda_1$ from the microdisplay 120 matched to the most-distal waveguide $140_1$ passes through the more proximal waveguides $140_2$-$140_4$. As described in the Background section, one problem with a conventional stack of layered waveguides is that wavelength bands intended to couple into distal waveguides also partially couple into more proximal waveguides, thereby degrading the color of the image reaching the eye box 130.

It is a property of the diffraction gratings in the waveguide 140 that they are sensitive to the polarization of the wavelength bands passing therethrough. Thus, a wavelength band at a first polarization may couple with one or more of the waveguide layers it passes through, but the same wavelength band at a second polarization different than the first may pass through the one or more waveguide layers without coupling. In accordance with aspects of the present technology, the polarization of a wavelength band of light is controlled so as to couple into its matched waveguide, while passing through other, unmatched, waveguides. Thus, in the example of FIG. 6, where a wavelength band $\lambda_1$ is matched to couple into waveguide $140_1$, its polarization is controlled so that it passes through waveguides $140_2$-$140_4$ before coupling within waveguide $140_1$.

Referring now to FIG. 7, the polarization of light incident upon a diffraction grating 144, 148 may be defined by the orientation of its electric and magnetic fields relative to a plane of incidence $P_i$. The plane $P_i$ may be defined by a propagation vector, PV, from the illumination source and a grating normal vector, GN. The vector PV is a projection of the k-vector of light on the waveguide 144, 148. The grating vector, GV, is a vector in the plane of the grating 144, 148 which defines the orientation of the grating lines. As used herein, the term "state E" refers to a state of polarization where the electric field component of a wavelength band along the grating vector, GV, is zero. As used herein, the term "state M" refers to a state of polarization where the magnetic field component along the grating vector, GV, is zero.

In the examples explained below, the polarization of the wavelength bands incident on the diffraction gratings in the various waveguides 140 is controlled to change between state E and state M. In embodiments, state M polarized wavelength bands incident on a diffraction grating pass through the diffraction grating, while state E polarized wavelength bands incident on a diffraction grating couple into the waveguide including that diffraction grating.

While the following examples describe the current technology in terms of controlling the state E and state M conditions of polarized light, it is understood that other polarization states may be used such that, in a first polarization state, the wavelength bands pass through a waveguide, but in the second polarization state, the wavelength bands couple to the waveguide. An example of further first and second polarization states are left and right polarizations of the wavelengths passing through waveguides 140. Moreover, while the following describes polarized light being in one of two states, it is contemplated that polarized light may occupy more than two states. In such embodiments, at least one state couples within a waveguide while at least one other state passes through without coupling.

Example embodiments will now be described with reference to FIGS. 8-9, which illustrate an optical element 115 comprised of two waveguides 140. FIG. 12 described below illustrates an example of an embodiment in which the optical element 115 may be comprised of n waveguides, where n can be different numbers of waveguides. A first embodiment will now be described with reference to FIG. 8 and the flowchart of FIG. 10. FIG. 8 shows a pair of waveguides $140_1$ and $140_2$. Discrete wavelength bands of light $\lambda_1$ and $\lambda_2$ are emitted from microdisplay 120, and collimated through lens 122 in step 300. The waveguides are arranged so that light from the microdisplay 120 passes first into waveguide $140_2$ and then into waveguide $140_1$.

The waveguides $140_1$ and $140_2$ may be matched respectively to the two different wavelength bands $\lambda_1$ and $\lambda_2$ emitted from microdisplay 120. As one example, waveguide $140_1$ may be tuned to red light and waveguide $140_2$ may be tuned to blue and green light. It is understood that waveguides $140_1$ and $140_2$ may be matched to other wavelength bands of one or more wavelengths of visible light in further embodiments.

Light emitted from the microdisplay 120 may be unpolarized light or state E polarized in this embodiment. Prior to entry into the first waveguide $140_2$, both wavelength bands $\lambda_1$ and $\lambda_2$ pass through a polarization state generator (PSG) 160. PSG 160 (as well as the PSGs described below) may be a known polarization state generator such as for example a waveplate or polarization retarder capable of shifting a phase of a specific wavelength band between two perpendicular polarization states, while leaving light of other wavelengths unaffected.

PSG 160 may be formed as a thin plate of birefringent materials that can be affixed within the optical element 115 in front of the diffraction grating 144 of the substrate 150 in the waveguide $140_2$. Where the diffraction grating is reflective, it is possible that PSG 160 may be incorporated into substrate 150 of waveguide $140_2$, in front of the diffraction grating 144 of waveguide $140_2$. The PSG 160 (as well as the PSGs described below) may have the same footprint as the waveguides 140, though it may be smaller or larger in embodiments. Where smaller, the PSG 160 may lie over at least the input diffraction grating 144. PSG 160 may for example be formed of a polymer film retarder, birefringent crystal retarder, liquid crystal retarder, or a combination of these. PSG 160 may be formed of other materials in further embodiments. PSG 160 (as well as the PSGs described below) may be manufactured for example by Meadowlark Optics, Inc., Frederick, Colo., USA.

PSG 160 may be configured to alter the polarization of wavelength band $\lambda_1$ from state E to state M in step 304. PSG 160 may leave the intensity and direction of wavelength band $\lambda_1$ unaffected. PSG 160 may also leave the polarization, intensity and direction of wavelength band $\lambda_2$ unaffected, allowing wavelength band $\lambda_2$ to pass straight through with little or no change.

As noted above, in embodiments, the discrete wavelengths from microdisplay 120 may be unpolarized. In such embodiments, PSG 160 may modulate the wavelength band $\lambda_1$ to state M as described above, and a second PSG (not shown) may modulate the wavelength band $\lambda_2$ to state E.

As noted above, state E polarized light is able to couple into a waveguide 140, where state M polarized light may not (or to a lesser extent). Thus, after state change through PSG 160, the state E polarized wavelength band $\lambda_2$ couples within the waveguide $140_2$ in step 308, where it is captured and transmitted out of the waveguide $140_2$ to the eye box 130.

Being state M polarized, the wavelength band $\lambda_1$ passes substantially or completely through waveguide $140_1$ without coupling or attenuation. In order to allow coupling of the wavelength band $\lambda_1$ within waveguide $140_1$, the wavelength band $\lambda_1$ passes through a second PSG 162 after leaving waveguide $140_1$ and prior to entry into waveguide $140_2$.

PSG 162 may be formed of the same material as PSG 160, but configured to modulate the polarization of wavelength band $\lambda_1$ from state M to state E in step 310. PSG 162 may be formed within optical element 115, sandwiched between waveguides $140_1$ and $140_2$. Alternatively, PSG 162 may be formed within the substrate 150 of waveguide $140_2$, behind its diffraction grating 144, or within substrate 150 of waveguide $140_1$, in front of its diffraction grating 144.

After the phase change through PSG 162, wavelength band $\lambda_1$ may couple into waveguide $140_1$ in step 314, where it is captured as described above, and transmitted out of the waveguide $140_1$ to the eye box 130. In this manner, light of different wavelengths may be transmitted from the microdisplay 120 using waveguides 140, while maintaining the color quality of the wavelengths transmitted through the optical element 115.

Figure 11:
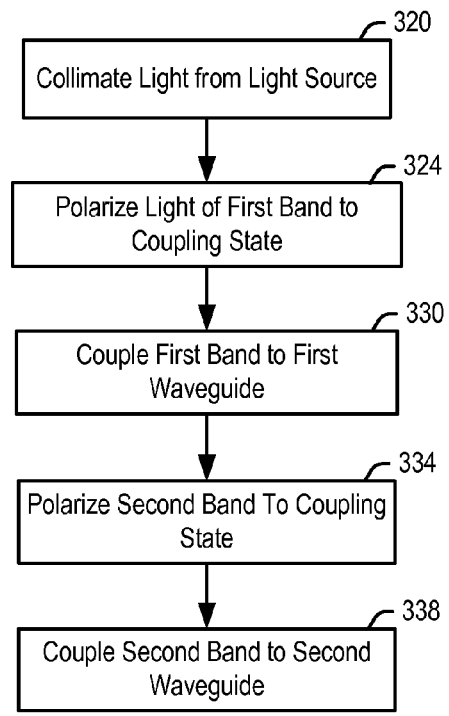
FIG. 11 is a flowchart of the operation of the imaging optics of the second embodiment shown in FIG. 9.

A further embodiment is now described with reference to FIG. 9 and the flowchart of FIG. 11. Discrete wavelengths of light are emitted from microdisplay 120, and collimated through lens 122 in step 320. The collimated light then passes initially into waveguide $140_2$. The waveguides $140_2$ and $140_1$ may be optimized for two different wavelength bands, $\lambda_1$ and $\lambda_2$, corresponding to the discrete wavelengths emitted from microdisplay 120 as described above. Light of all wavelengths emitted from the microdisplay 120 may be unpolarized or state M polarized in this embodiment. Prior to entry into the first waveguide $140_2$, both wavelength bands $\lambda_1$ and $\lambda_2$ pass through a PSG 166.

PSG 166 may be formed of the same material and size as PSG 160, but configured to alter the polarization of wavelength band $\lambda_2$ from state M to state E in step 324. PSG 166 may leave the intensity and direction of wavelength band $\lambda_2$ unaffected. PSG 166 may also leave the polarization, intensity and direction of wavelength band $\lambda_1$ unaffected, allowing wavelength band $\lambda_1$ to pass straight through without change.

Where light from the microdisplay 120 is unpolarized, PSG 166 may modulate the wavelength band $\lambda_2$ to state E as described above, and a second PSG (not shown) may modulate the wavelength band $\lambda_1$ to state M.

After state change through PSG 166, the state E polarized wavelength band $\lambda_2$ couples within the waveguide $140_2$, where it is captured as described above, and transmitted back out of the waveguide $140_2$ to the eye box 130.

Being state M polarized, the wavelength band $\lambda_1$ may pass substantially or completely through waveguide $140_1$ without coupling or attenuation. In order to allow coupling of the wavelength band $\lambda_1$ within waveguide $140_1$, the wavelength band $\lambda_1$ passes through a second PSG 168 after leaving waveguide $140_1$ and prior to entry into waveguide $140_2$. PSG 168 may be the same as PSG 162 in FIG. 8, and may also modulate the wavelength band $\lambda_1$ from state M to state E in step 334. Thereafter, wavelength band $\lambda_1$ may couple into waveguide $140_1$ in step 338 where it is captured as described above, and transmitted back out of the waveguide $140_1$ to the eye box 130.

Using a system of PSGs in front of and interleaved between the waveguides, various numbers of wavelength bands may be polarized as described above so as to pass through unmatched waveguides and couple with full or near full intensity within their matched waveguide. The system of PSGs may be such that the polarization of a wavelength band approaching an unmatched waveguide is already in a state M condition so that it will pass through the unmatched waveguide unaffected. Alternatively, the polarization of a wavelength band approaching an unmatched waveguide may be in a state E condition, so that it is passed through a PSG to modulate it to state M, where it may then pass through the unmatched waveguide unaffected. That wavelength band may remain thereafter in the state M condition, until it reaches its matched waveguide, at which point it is passed through a PSG to modulate it to state E so that it may couple into its matched waveguide.

An example including n wavelength bands and waveguides is shown and now described with respect to FIG. 13. While the example of FIG. 13 shows n being equal to four or more wavelength bands and waveguides, a further example may also include three wavelength bands and waveguides.

Discrete wavelength bands $\lambda_1, \lambda_2, \lambda_3, \ldots$ and $\lambda_n$ are emitted from microdisplay 120, and collimated through lens 122. In one example, all wavelengths of light from microdisplay 120 may be polarized to state M. In this instance, this embodiment may include a PSG $170_1$ as described above, configured to modulate the polarization of $\lambda_1$ to state E while leaving the remaining wavelength bands polarized to state M. In further embodiments, the wavelength bands emitted from microdisplay 120 may have other polarizations, or no polarizations. In these further embodiments, one or more PSGs may be positioned in front of (or integrated into) waveguide $140_1$ so that, after passing through the one or more PSGs and entering the input diffraction grating 144 of waveguide $140_1$, wavelength band $\lambda_1$ is state E polarized, and wavelength bands $\lambda_2$ through $\lambda_n$ are state M polarized.

The state E polarized wavelength band $\lambda_1$ may then couple into the waveguide $140_1$, where it is captured as described above, and transmitted back out of the waveguide $140_1$ to the eye box 130. Being state M polarized, the remaining wavelength bands $\lambda_2$ through $\lambda_n$ pass substantially or completely through waveguide $140_1$ without coupling or attenuation.

Next, the remaining wavelength bands $\lambda_2$ through $\lambda_n$ are passed through a second PSG $170_2$, which modulates the wavelength band $\lambda_2$ to state E while leaving the remaining wavelength bands $\lambda_3$ through $\lambda_n$ substantially or completely unaffected.

The state E polarized wavelength band $\lambda_2$ may then couple into the waveguide $140_2$, where it is captured as described above, and transmitted back out of the waveguide $140_2$ to the eye box 130. Being state M polarized, the remaining wavelength bands $\lambda_3$ through $\lambda_n$ pass substantially or completely through waveguide $140_2$ without coupling or attenuation.

This process is repeated for each of the remaining waveguides. Each wavelength band may be polarized to pass through unmatched waveguides, until it reaches its matched waveguide, at which time it may be polarized to couple into its matched waveguide. The last wavelength band $\lambda_n$ passes through all of the waveguides $140_1$ through $140_{n-1}$ until it reaches waveguide $140_n$. Prior to passing through waveguide $140_n$, the wavelength band $\lambda_n$ is passed through PSG $170_n$, and polarized to a state which can then couple into waveguide $140_n$.

It is understood that other configurations of PSGs may be provided so that the wavelength band matched to a waveguide is polarized to couple with that waveguide, while all other wavelength bands are polarized to pass through that waveguide. In this manner, light of different wavelengths may be transmitted through optical element 115 using the waveguides and PSGs described above, while maintaining the color quality of all wavelengths transmitted through the optical element 115.

After coupling within and leaving distal waveguides, wavelength bands pass through each of the more proximal waveguides en route to the eye box 130. As described above with respect to FIG. 4, each waveguide 140 includes an exit diffraction grating (148) which couples light already in the waveguide out of the waveguide. Exit gratings 148 may allow incident wavelength bands returning from more distal waveguides to pass largely or entirely straight through without coupling. However, it may happen that light rays from more distal waveguides at least partially couple into more proximal waveguides en route to the eye box 130.

As such, in further embodiments, in addition to providing PSGs over the input diffraction gratings 144 to control coupling of light from microdisplay 120 within the respective waveguides, PSGs may also be provided over the exit diffraction gratings 148. The exit grating PSGs prevent light from a distal waveguide from coupling within more proximal waveguides as it travels to the eye box 130. One such example is shown in FIG. 13. In this example, wavelength bands $\lambda_1$ through $\lambda_n$ couple into their matched waveguide while passing through unmatched waveguides as described above. Upon a wavelength band exiting its matched waveguide, its polarization may again be switched by one of PSGs $180_1$ to $180_n$, for example from state E to state M, so that it then passes through the more proximate waveguides without coupling. In this example, the last PSG before the eye box, PSG $180_1$, may polarize the wavelength bands $\lambda_1$ through $\lambda_n$ in a variety of manners as desired for presentation to the eye 132 of a user through the eye box 130.

In some of the above described embodiments, state E polarized wavelengths have been described as coupling within their matched waveguides, while state M polarized wavelengths pass through unmatched waveguides unabated. However, instead of complete coupling/complete pass through, both state E and state M polarized wavelengths may partially couple into waveguides upon which they are incident. However, through use of PSGs as described above, the coupling efficiency of a state E polarized wavelength may be increased relative to the coupling efficiency of a state M polarized wavelength.

Figure 15:
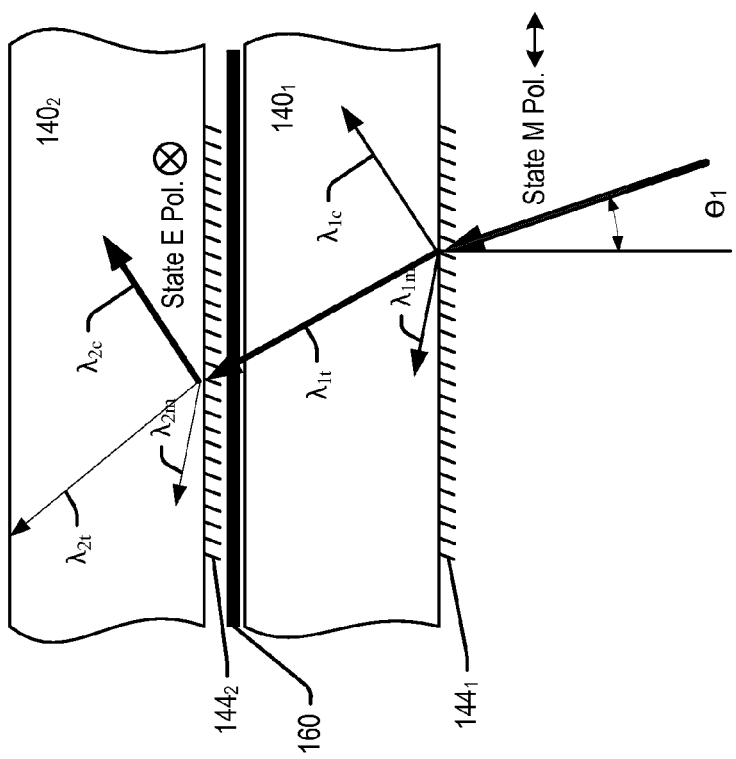
FIG. 15 is an edge view illustrating a wavelength band travelling through a pair of waveguides with controlled polarization according to embodiments of the present technology.
Figure 14:
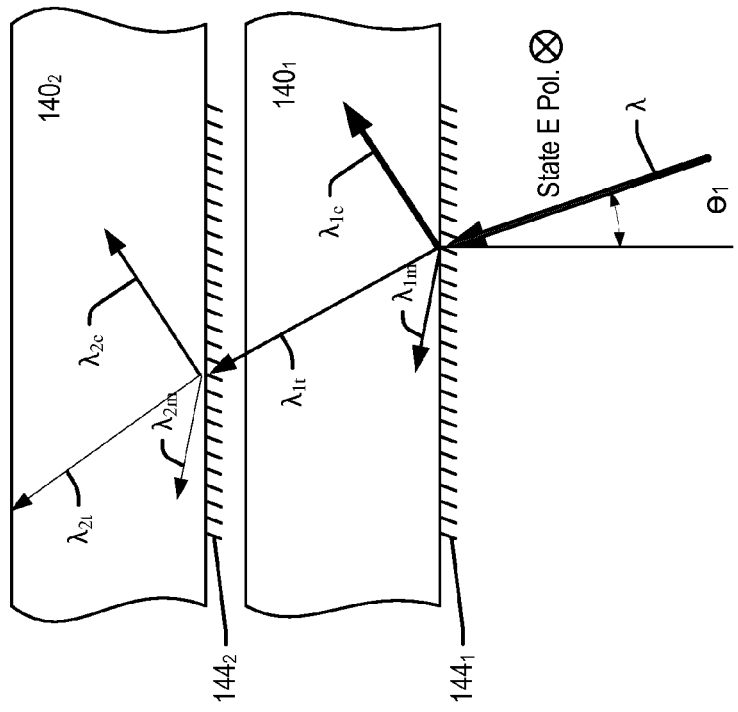
FIG. 14 is an edge view illustrating a wavelength band travelling through a pair of waveguides without controlled polarization.
Figure 16:
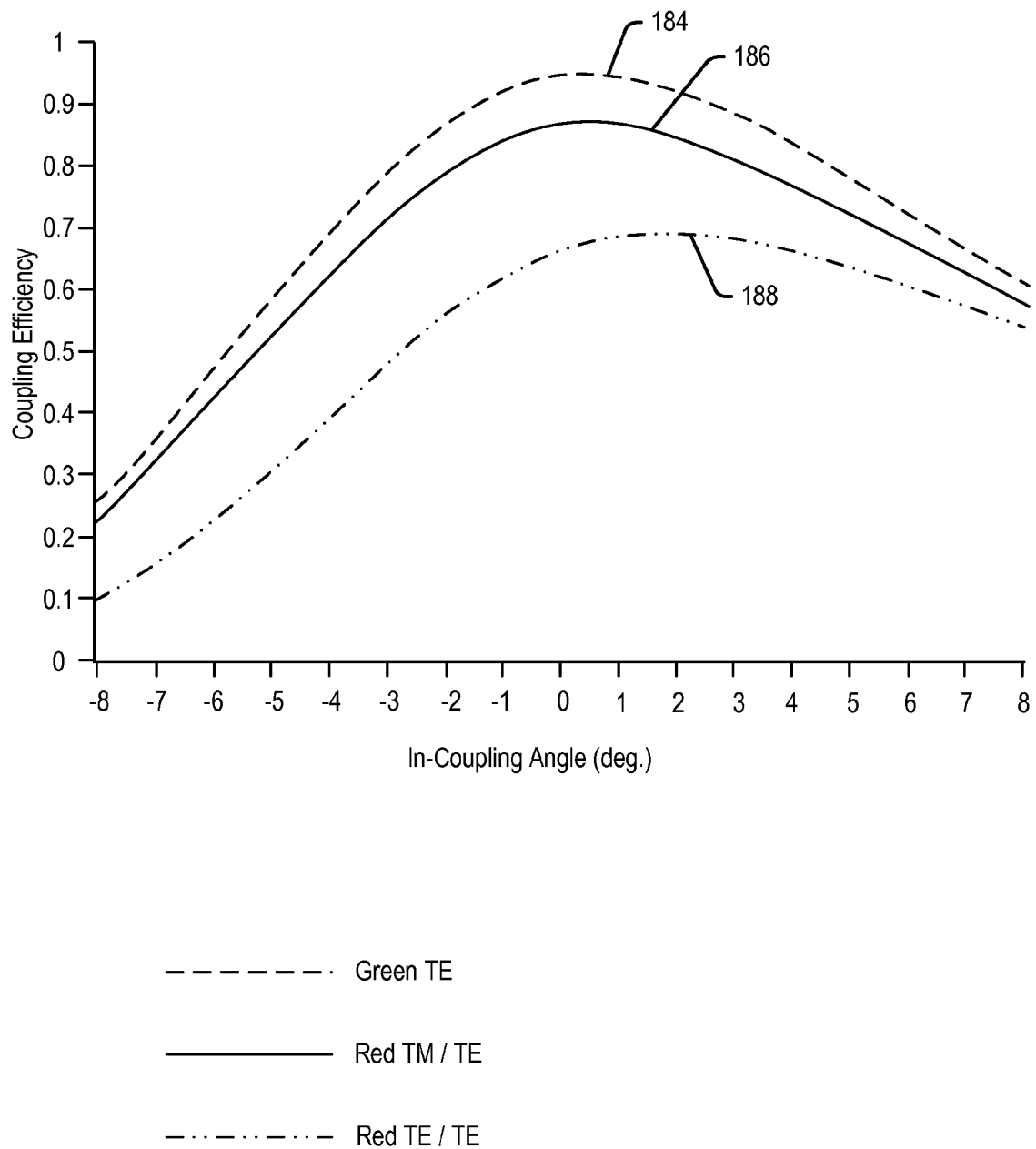
FIG. 16 is a graph showing coupling efficiencies of the wavelength bands of FIGS. 14 and 15.

An example of this is set forth in FIGS. 14 through 16. FIGS. 14 and 15 each show edge views of a wavelength band $\lambda$ incident on a pair of waveguides $140_1$ and $140_2$. The wavelength band $\lambda$ is matched to waveguide $140_2$, but first passes through waveguide $140_1$. FIGS. 14 and 15 are the same as each other, except that in FIG. 15, the polarity of the wavelength band is controlled using a PSG 160, where no PSG is used in FIG. 14.

In FIG. 14, the incoming wavelength band is incident on the diffraction grating 144 in unmatched waveguide $140_1$ at an angle of incidence $\theta_1$. Uncontrolled, the wavelength band may have state E polarization, so that a portion $\lambda_{1c}$ couples into the waveguide $140_1$. A second portion $\lambda_{1m}$ is diffracted in a second order diffraction (there may be additional grating order diffractions, not shown). The remaining portion $\lambda_{1t}$ is transferred through waveguide $140_1$ and enters its matched waveguide $140_2$. As a relatively large component of the wavelength band $\lambda$ coupled within waveguide $140_1$, a smaller portion $\lambda_{2c}$ is left to couple into waveguide $140_2$.

Conversely, in FIG. 15, the same wavelength band $\lambda$ has its polarization set to state M before entering waveguide $140_1$ (for example by a PSG, not shown). As indicated, a relatively small portion $\lambda_{1c}$ of the wavelength band couples into the waveguide $140_1$. As such, the portion $\lambda_{1t}$ that transfers through waveguide $140_1$ is larger. Between waveguides $140_1$ and $140_2$, the polarization of the wavelength band is changed from state M to state E by a PSG 160. The state E polarized wavelength $\lambda$ consequently has a relatively large portion $\lambda_{2c}$ that couples within its matched waveguide $140_2$.

FIG. 16 is a graph of coupling efficiencies verses the incoupling angle of incidence. Coupling efficiency here is defined as a ratio (expressed as a number between 0 and 1) of the intensity of a wavelength band emitted from the light source and the intensity of the wavelength coupled within its matched waveguide. This example uses red light (650 nm) as the wavelength band shown in FIGS. 14 and 15 matched to waveguide $140_2$. The graph also shows a second wavelength band of green light (540 nm). The green wavelength band is not shown in FIGS. 14 and 15, but it is matched to and couples within the first waveguide $140_1$. The grating period for the diffraction grating $144_1$ for the first waveguide $140_1$ is 450 nm and the grating period of the diffraction grating $144_2$ for the second waveguide $140_2$ is 550 nm.

As seen in the graph of FIG. 16, the curve 184 of the green wavelength band shows the highest coupling efficiency, above 90%, owing to the fact that the green wavelength couples into its matched waveguide without having to travel through any other waveguides. As seen, the curve 186 of the red wavelength band of FIG. 15, coupled to its waveguide using controlled polarities according to the present technology, shows a coupling efficiency of about 88%. The curve 188 of the red wavelength band of FIG. 14, without controlled polarization, shows a lower coupling efficiency, less than 70%. Thus, as seen the PSGs of the present technology are able to impede coupling of light into unmatched waveguides, and facilitate coupling of light into matched waveguides.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for presenting an image, comprising:
   (a) projecting light from a light source into an optical element, the light including at least first and second wavelength bands, and the optical element including at least first and second waveguides, the first and second waveguides each having at least one optical grating;
   (b) modifying, for a first time, the polarization of the second wavelength band incident on the first waveguide from a first state to a second state so that the second wavelength band predominantly does not couple within the first waveguide;
   (c) controlling the polarization of the first wavelength band incident on the first waveguide to be different than the polarization of the second wavelength band incident on the first waveguide so that the first wavelength band couples within the first waveguide to a greater extent than the other than first wavelength bands; and
   (d) modifying, for a second time, the polarization of the second wavelength band incident on the second waveguide from the second state to the first state so that the second wavelength band predominantly couples within the second waveguide.

2. The method of claim 1, wherein said step of controlling the polarization of the first wavelength band to be different than the polarization of the second wavelength bands comprises the step of modifying the polarization of the first wavelength band incident on the first waveguide.

3. The method of claim 1, wherein said step of controlling the polarization of the first wavelength band to be different than the polarization of the second wavelength bands comprises the step of modifying the polarization of the first wavelength band incident on the first waveguide from a first state to a second state, the first wavelength band coupling within the first waveguide to a greater extent in the second state as compared to the first state.

4. The method of claim 1, wherein said step of controlling the polarization of the first wavelength band to be different than the polarization of the second wavelength band comprises the step of modifying the polarization of the first wavelength band incident on the first waveguide from a polarization where a magnetic field component of the first wavelength band along a grating vector is zero to a polarization where an electric field component of the first wavelength band along a grating vector is zero.

5. The method of claim 4, wherein the light further comprises a third wavelength band, the method further comprising controlling the polarization of the second wavelength band to be different than the polarization of the third wavelength band by modifying the polarization of the second wavelength band incident on the second waveguide from a polarization where a magnetic field component of the second wavelength band along the grating vector is zero to a polarization where an electric field component of the second wavelength band along the grating vector is zero, while the third wavelength band has a polarization where a magnetic field component of the third wavelength band along the grating vector is zero.

6. The method of claim 1, wherein said step of projecting light including a first wavelength band from a display into an optical element comprises the step of projecting light wherein the first and second wavelength bands are comprised of light from the visible spectrum.

7. The method of claim 1, wherein the at least first and second waveguides comprise four waveguides.

8. A method for presenting an image, comprising:
  (a) projecting light from a light source into an optical element, the light including a plurality of wavelength bands, and the optical element including a plurality of waveguides, a wavelength band of the plurality of wavelength bands being matched to a waveguide of the plurality of waveguides; and
  (b) passing the wavelength band through a plurality of polarization state generators, each polarization state generator associated with a waveguide of the plurality of waveguides, the plurality of polarization state generators controlling the polarization of the wavelength band passing therethrough to change, a first time, from a first state to a second state to pass through one or more waveguides and to change, a second time from the second state back to the first state facilitating coupling of the wavelength band within the matched waveguide, while impeding coupling of remaining wavelength bands passing through the matched waveguide.

* * * * *